United States Patent [19]
Cho

[11] Patent Number: 5,822,636
[45] Date of Patent: Oct. 13, 1998

[54] CAMERA-CAP COMBINATION

[76] Inventor: Sung-Jae Cho, 305-1, Bang-o-dong, Dong-ku, Ulsan-city, Kyungsangnam-do, Rep. of Korea, 689-810

[21] Appl. No.: 868,193

[22] Filed: Jun. 3, 1997

[51] Int. Cl.⁶ ................................................. G03B 29/00
[52] U.S. Cl. ......................... 396/420; 396/433; 396/502
[58] Field of Search ............................... 396/56, 59, 263, 396/265, 419, 420, 427, 429, 433, 502, 504; 2/209.13, 209.14; 224/181, 908; 359/818

[56] References Cited

U.S. PATENT DOCUMENTS

| | | | |
|---|---|---|---|
| 2,369,829 | 2/1945 | Johnson | 396/420 X |
| 4,312,076 | 1/1982 | Gamm | 2/199 |
| 4,603,944 | 8/1986 | Greenlaw et al. | 359/818 |
| 4,689,834 | 9/1987 | McCarthy et al. | 2/422 |
| 4,753,378 | 6/1988 | Kastendieck et al. | 224/181 |
| 5,128,700 | 7/1992 | Inoue et al. | 396/429 X |

*Primary Examiner*—Howard B. Blankenship
*Attorney, Agent, or Firm*—Barbara A. Fisher

[57] ABSTRACT

A camera-cap with a light manual camera operated by remote control, the camera being attached on the head cover portion of the cap with its lens looking forwardly, and a multipurpose cap which includes: a rear view mirror being placed in front of the cap, the mirror angle being controlled by fixed and pivot arms attached to the side of the head cover portion; a camera attached on the front part of the head cover portion and operated by remote control; and an audio recorder attached to the front part of the head cover portion and also operated by remote control.

5 Claims, 3 Drawing Sheets

CAMERA-CAP COMBINATION

The present invention relates to a hat or a cap and in particular to such a hat or a cap with an attached camera to assist a user to perform consecutive and swift snapshots.

Additionally, the present invention relates to a multipurpose cap which includes a rear-view mirror for observing the direction behind the user, a camera and an audio recorder.

BACKGROUND OF THE INVENTION

Generally, a hat or a cap does not have any special functions other than to cover and protect a user's head and provide shading from sun light. It is difficult to satisfy various consumer needs only with these functions in today's civilized society.

There are, in general, two kinds of photographic cameras, automatic cameras and manual cameras. An automatic camera is automatically adjusted and usually includes a shutter, a film winding, flash and focus devices. In the manual camera which is relatively smaller and lighter than the automatic camera, the above functions are manually operated. The weight of the manual camera may be about half of that of the automatic one. Even though automatic cameras are bigger and heavier than the manual ones, consumers prefer to use automatic cameras today.

Sometimes it may be desirable and necessary to make a quick snapshot of a fast moving object. For example, when a person observes a hit-and-run car or traffic offenders, when a guard or an academic researcher makes pictures to render an unexpected event, when a police officer takes photographs of an accident, and so on. In these cases, quick snapshots are difficult to obtain with a customary hand-carried camera. In addition, it is inconvenient to carry a customary camera.

SUMMARY OF THE INVENTION

Therefore, the present invention is directed to a camera-cap and a multipurpose cap that simplify the process of making snapshots and avoid the limitations and disadvantages of the related art.

The object of the present invention is to provide a cap with an attached camera which is convenient to carry, easy to handle, and capable of taking quick pictures.

Another object of the present invention is to provide a cap with an attached camera and additional devices to fulfil various functions.

Additional features and advantages of the invention are set forth in the description which follows, and in part will be apparent from the description, or may be learned by practice of invention will be realized and attained by the embodiments as illustrated in the written description and claims hereof, as well as the appended drawings.

In accordance with the first preferred embodiment of the present invention, a camera-cap contains a manual camera mounted on the front part of a head cover portion. The camera has a shutter and a manual film winder which are engaged with a shaft extended from a direct current (DC) motor, a driving gear and a revolving actuator. The DC motor is operated by a remote control receiver. The remote control automatically actuates the shutter and film winder of the manual camera.

In accordance with the second preferred embodiment, a multipurpose cap includes a rear view mirror for observing the direction behind a user, an automatic camera for instantaneous photographing of the front area, and an audio recorder with a microphone. The cap thereby assists to accomplish the functions of observing the rear view, taking pictures, and recording sound.

It is to be understood that both the foregoing general description and the following detailed description are exemplary and explanatory and are intended to provide further explanation of the invention as claimed.

BRIEF DESCRIPTION OF THE DRAWINGS

The following drawings, which are included to provide a further understanding of the present invention and are incorporated in and constitute a part of this specification, illustrate the preferred embodiments of the invention and together with the description serve to explain the principles of the invention.

In the drawings.

DETAILED DESCRIPTION OF PREFERRED EMBODIMENTS

Figure 1:
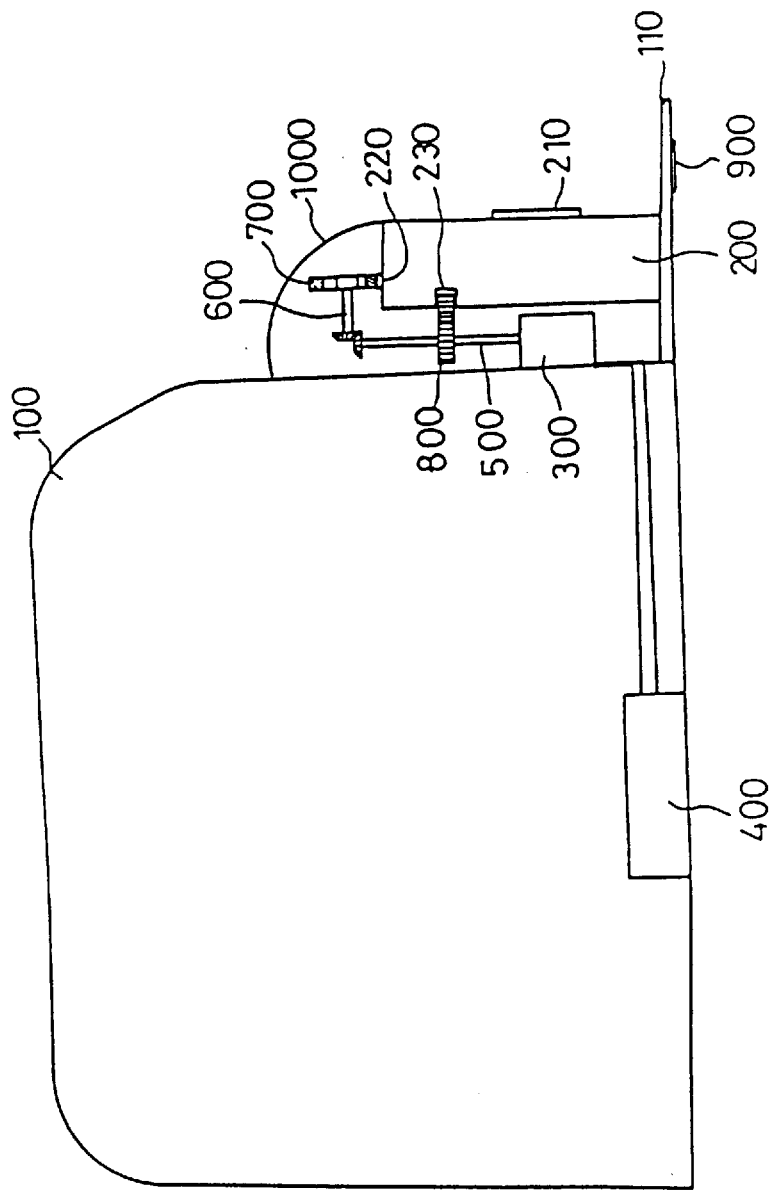
FIG. 1 is a side view of a camera-cap in accordance with the first embodiment of the present invention.
Figure 2:
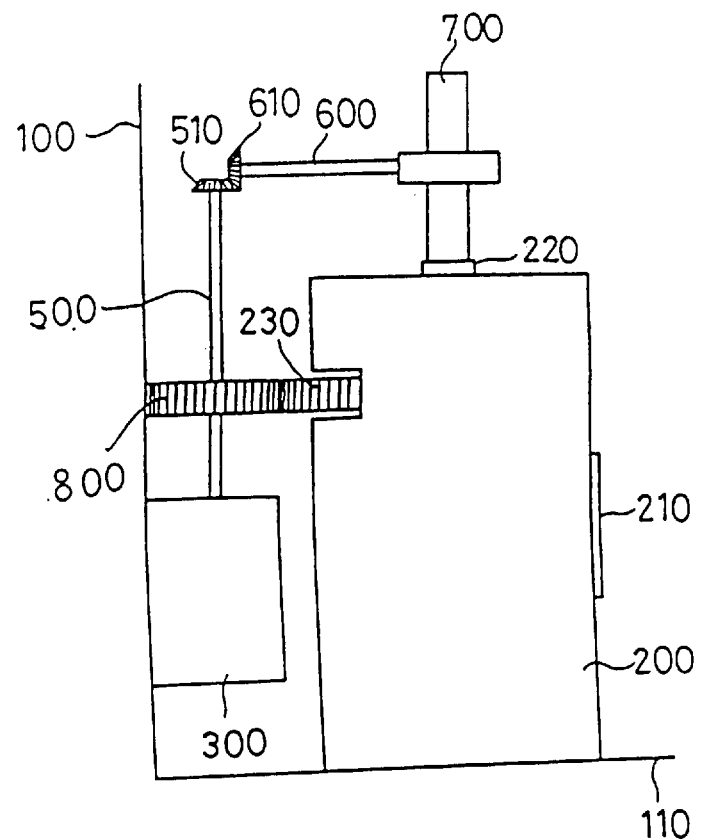
FIG. 2 is an enlarged view of a driving means of the first embodiment.
Figure 3:
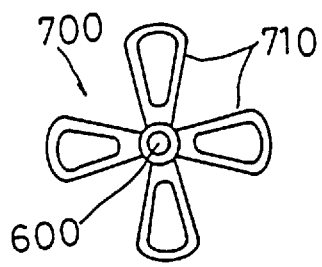
FIG. 3 is a front view of the revolving actuator with a plurality of vanes.

Referring to FIG. 1, the camera-cap in accordance with the first preferred embodiment of the present invention is illustrated. The cap has a head cover portion 100 and a beak 110. The manual camera 200 is equipped with a lens 210, a button-released shutter 220, and a gear type film winder 230 in its front, upper, and back parts, respectively. The camera is mounted on the beak 110 having its lens 210 directed forwardly. The direct current (DC) motor 300 is connected to an electric power supply provided by a battery 400, which is a driving source for the device and can be attached to the side or front of the head cover portion 100. The rotating shaft 500 is an extension of the DC motor shaft. The bar 600 is an axis of a revolving actuator 700. The revolving actuator 700 is shaped as a windmill, as shown in FIG. 3, and has a plurality of vanes 710 projecting at regular intervals. The actuator 700 is arranged on the end of the axis 600 in such a way that its vanes may press the button-released shutter 220 placed in the top part of the camera 200. The axis 600 is engaged with the shaft 500 by means of bevel gears 510 and 610 to transmit the rotation from the rotating shaft 500 to the actuator 700. The driving gear 800 is arranged coaxially on the shaft 500 and engaged with the film winder 230 on the back of the camera 200 through gears. The remote control receiver 900 is attached to the bottom of the beak 110 and electrically connected to the DC motor 300.

A usual cap with a head cover portion and a beak is utilized as a cap-camera, and there is no need for any special elements or requirements to the cap used in the present invention. A manual camera is utilized as camera 200. The camera is solidly attached to the beak 110 using a screw or binding band. It also has an additional plastic support 1000. The DC motor 300 is attached to the front part of cap 100, being located behind the camera 200. It is electrically connected to the battery 400 and a remote control receiver 900. The batteries 400 shown on FIG. 1 are respectively attached to both sides of the cap 100.

The following is an explanation of the camera-cap operation according to the present invention.

A user wearing cap 100 of the present invention can take a picture by directing cap 100 to a subject and pressing the button of the remote control in his hand. Once the user presses the button of the remote control, the remote control receiver 900, which is attached to the bottom of the beak 110 and electrically connected to the DC motor 300, receives a signal transmitted by the remote control and sends it to the DC motor 300. The DC motor 300, which is continuously supplied with electric power from the battery 400, immediately starts. When the DC motor 300 starts, the shaft 500 extending vertically from the motor shaft rotates with the motor shaft. The vertical shaft 500 and the horizontal axis 600 of the revolving actuator 700 are interlocked by bevel gears 510 and 610 arranged on the ends of shaft 500 and axis 600 respectively. They go in gear with teeth, thus transmitting rotation from the shaft 500 to the axis 600. The revolving actuator 700 arranged on the axis 600 rotates, and one of the vanes 710 presses shutter 220, resulting in the operation of the camera, or a snapshot. Simultaneously with the snapshot, the driving gear 800 arranged on the rotating shaft 500 goes in gear with the film winder 230, thus moving the film winder 230 to wind the photographic film.

Several consecutive shots can be accomplished by repeating the above operations.

As describe above, in the camera-cap according to the present invention a manual camera is attached on the front part of a customary cap 100; the shutter 220 and the film winder 230 of the camera 200 are driven by the revolving actuator 700 and the driving gear 800 which are turned on by the DC motor 300; and the DC motor is operated by the remote control receiver 900. Therefore, this invention allows to make snapshots using only the remote control, thereby swiftly managing any unexpected circumstances. The camera-cap is also easy to carry and to provide maintenance.

Figure 4:
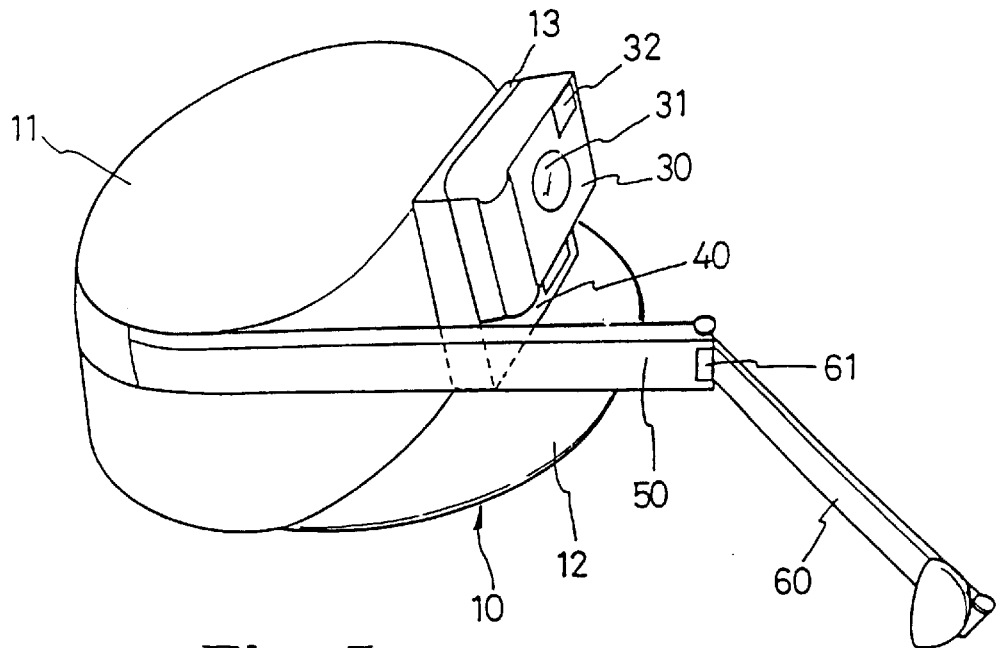
FIG. 4 is a perspective view of a multipurpose cap in accordance with the second embodiment of the present invention.
Figure 5:
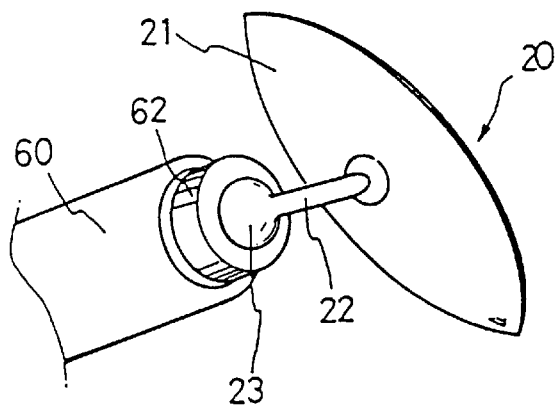
FIG. 5 is a perspective view of a coupling state of a rear view mirror.
Figure 7:
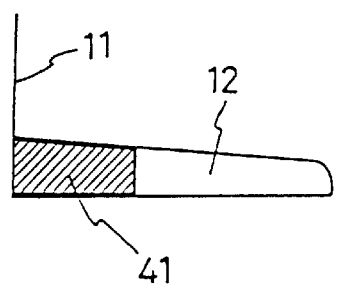
FIG. 7 is a cross-sectional view of the cap beak with an installed microphone.

Referring to FIG. 4, a multipurpose cap in accordance with the second preferred embodiment of the present invention is illustrated. The multipurpose cap 10 includes a head cover portion 11 and a beak 12. A rectangular cabinet 13 of a predetermined size is formed on the front side of the cap 10 and has an open front side. An automatic camera 30 is fixed to the cabinet 13 in such a manner that its lens 31 and lamp 32 are directed forwardly. The camera is operated by a remote control. A recorder 40 having microphone 41 is a miniature device also controlled by the remote control. It is installed under the camera 30 in the cabinet 13. The microphone 41, as shown in FIG. 7, is mounted on the beak 12 to collect the ambient sound. The rear view mirror 20 is installed in front of the cap 10 to provide a controlled angle for observing the direction behind the user. The mirror 20 is mounted on the end of a pivot arm 60. The pivot arm is pivotally connected with a fixed arm 50 which extends from the side of the head cover portion 11. As shown in FIG. 5, the joint 22 includes a ball shaped rotation part 23 connected to a housing 21 of the mirror 20. The ball 23 is inserted into a socket 62 in the pivot arm 60, so that the mirror angle can be adjusted.

Figure 6:
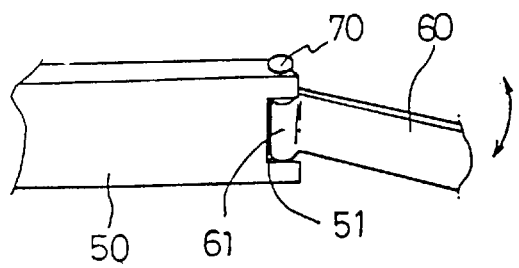
FIG. 6 is a perspective view of a coupling state of fixed and pivot arms.

The fixed arm 50 is attached to one side of the head cover portion 11, extending forwardly. The fixed arm 50 is formed integrally with the head cover portion 11. However, when necessary, it can be attached to the head cover portion 11 after being formed separately. A guide groove 51 of U-shape is formed in one end of the fixed arm 50. The pivot arm 60 is connected to the fixed arm 50 by an integrated rotation part 61 having a round cross section, as shown in FIG. 6. The pivot part is engaged with the guide groove 51 of the fixed arm 50 using a hinge pin 70. The socket 62 into which the rotation part 23 of the mirror housing 21 is inserted, is attached to the other end of the pivot arm 60.

The head cover portion 11 and the beak 12 of the cap 10 are made from intensified plastic to support the weight of various elements and facilitate their attachment.

Using the multipurpose cap in accordance with the present invention a user can simultaneously observe the area behind his back, make photographs and record sounds. The user can adjust the angle of the rear view mirror 20. When a driver wears this cap, he can catch the movement in the dead angle area, 20 which is not available with an existing rear view mirror installed in a car. Therefore, the use of the multipurpose cap of the present invention can prevent accidents on the road.

A user can swiftly photograph with camera 30 using the remote control, thereby facilitating control over hit and run cars and other traffic violators. Additionally, when guarding public facilities or investigating for academic research, instantaneous events can be caught using the cap of the present invention. This cap is also very useful when a police officer photographs the scene of an incident.

The recorder 40 containing a microphone 41 can catch even a slightest sound. Using the recorder 40 together with the camera 30 the user of the cap of the present invention can obtain some vivid data or evidence during an investigation. This cap can also be effectively utilized in interviewing.

As described above, the multipurpose cap in accordance with the present invention includes: a rear view mirror 20, for observing the direction behind a user; a camera 30, for swiftly photographing instantaneous events in front of the user; and an audio recorder 40, thereby assisting in accomplishing a swift control under various circumstances.

It will be apparent to those skilled in the art that various modifications and variations can be made in the camera-cap and the multipurpose cap of the present invention without deviating from the spirit or scope of the invention. Thus, it is intended that the present invention cover the modifications and variations of this invention provided they come within the scope of the appended claims and their equivalents.

I claim:

1. A camera-cap including a head cover portion, a camera having a film winding gear and a shutter release mounted on the head cover portion, drive means for actuating the camera, and a power supply, characterized in that:

said drive means including:
   a direct current motor mounted to the head cover portion;
   a remote control receiver mounted to the head cover portion, said remote control receiver actuating said direct current motor in response to a signal received by said remote control receiver;
   a first rotatable shaft extending from said direct current motor;
   a driving gear arranged on said first rotatable shaft for rotating the film winding gear of the camera;
   a first bevel gear mounted on a distal end of said first rotatable shaft for rotation therewith;
   a second bevel gear engaged and rotated by said first bevel gear;

a second rotatable shaft positioned transverse to said first rotatable shaft and having one end connected to said second bevel gear; and at least one vane mounted on an end of said second rotatable shaft opposite said second bevel gear, said at least one vane actuating said shutter release of the camera upon rotation of said second rotatable shaft.

2. The camera-cap according to claim 1, wherein said at least one vane includes a plurality of vanes.

3. The camera-cap according to claim 2, wherein said plurality of vanes are at equally spaced intervals.

4. The camera-cap according to claim 1, wherein said camera is mounted external to cap.

5. The camera-cap according to claim 1, wherein said power supply is a battery mounted on the head cover portion.

* * * * *